United States Patent Office 3,306,733
Patented Feb. 28, 1967

3,306,733
URANIUM-MOLYBDENUM ALLOY CONTAINING SMALL AMOUNTS OF OTHER METALS
Pierre Blanchard, Jeanne Lehmann, and André Virot, Gif-sur-Yvette, France, assignors to Commissariat à l'Energie Atomique, Paris, France, a corporation of France
No Drawing. Filed July 15, 1965, Ser. No. 472,303
Claims priority, application France, July 21, 1964, 982,442
2 Claims. (Cl. 75—122.7)

This invention relates to a new uranium alloy and a nuclear fuel element made with such an alloy, of use more particularly in a nuclear reactor of the pressure $CO_2$-cooled natural-uranium type.

The progressive increase of the specific power of the above type of reactor has necessitated an increased pressure and flow of coolant and replacement of the solid uranium rods by tubes with increasingly reduced wall-thicknesses to obviate excessive temperatures within the fissile material for a given coolant temperature. However, the value to which the wall-thickness can be reduced is limited by the creep strength of the fuel material.

This invention relates to a uranium alloy having a microstructure made up of very fine $\alpha$ grains with a fine dispersion of another phase. The two factors are considered as being favourable for the behaviour of the material in nuclear reactors, particularly in respect of improved resistance to the deformations due to the effects of irradiation: increased grain size, creep and swelling. This microstructure of such an alloy enables it to be used for the production of fuel material tubes for a nuclear reactor having a high specific power.

An alloy according to the invention contains 0.8% to 1.5% by weight of molybdenum, 0.02% to 0.2% by weight of one or two additional metals, the remainder being uranium.

According to a first preferred embodiment of the invention, the alloy is a ternary alloy and is made up of a uranium alloy containing 0.8% to 1.5% by weight of molybdenum, 0.02% to 0.08% by weight of a metal selected from the following elements: silicon, tin, chromium, and yttrium, the remainder being uranium.

According to a second preferred embodiment of the invention, the alloy is a quaternary alloy and is a uranium alloy containing 0.8 to 1.5% by weight of molybdenum, 0.02 to 0.08% by weight of aluminium, 0.02 to 0.08% by weight of a metal selected from the following elements: silicon, tin, and chromium, the remainder being uranium.

Finally, according to a third preferred embodiment of the invention, the alloy is a quaternary alloy and is a uranium alloy containing 0.8% to 1.5% by weight of molybdenum, 0.02 to 0.08% by weight of silicon, 0.02 to 0.08% by weight of a metal selected from the following elements: tin and chromium, the remainder being uranium.

The introduction of small amounts of elements such as aluminium, silicon, tin, chromium, yttrium, into the binary uranium-molybdenum alloy has the effect of producing either a very fine dispersion of an intermetallic compound or of the additional metal, or a fine precipitation of a resistant $\gamma$ phase. This $\gamma$ phase is hardened by the additional elements hereinbefore cited being put into the form of a solid solution, so that the material has a high creep strength and can be used for the production of fuel elements of tubular shape for use in nuclear reactors of the gas-graphite type.

When silicon is incorporated in the binary uranium-molybdenum alloy it is advantageous not to exceed a silicon content of 0.08% by weight because above such concentration the alloy is very fragile because of the presence of the intermetallic compound $U_3Si_2$ distributed at the level of the joints of $\gamma$ grains.

By way of example, the values of the creep rates of ternary or quaternary alloys are given below as compared with those of the corresponding binary alloy, as found at 600° C. under a stress of 1 kg. per sq. mm.

U-Mo 1.1% _____ $20.10^{-6}$/h.
U-Mo 1.1% Si 0.05% _____ $3.10^{-6}$/h.
U-Mo 1.1% Al 0.05% Cr 0.05% _____ $5.10^{-6}$/h.
U-Mo 1.1% Al 0.05% Sn 0.05% _____ $5.10^{-6}$/h.

One example of the preparation of an alloy according to the invention will now be described by way of example.

The various metallic constituents of the alloy in a high purity and suitable proportions are placed in a cavity inside the uranium billet. The latter is disposed in a lined graphite crucible. Melting is carried out under a vacuum of $10^{-4}$ to $10^{-5}$ mm. of mercury in an induction furnace at a temperature equal to at least 1450° C. for a period of up to 30 minutes to ensure homogeneity of the mixture of the various constituents. The resultant alloy is then poured into moulds of suitable shape to produce tubes of fuel material.

To obtain the appropriate microstructure the moulded material must be cooled at a rate between 2 and 50° C. per minute, depending on the nature of the alloy. This cooling may be carried out either directly after casting or after removal from the mould in an induction furnace whose power is progressively reduced to give the required rate of cooling.

The fuel material tube thus prepared is then covered at least on the outside with a metal can to form a fuel element which can advantageously be used in a nuclear reactor of high specific power.

We claim:
1. A uranium alloy containing 0.8 to 1.5% by weight of molybdenum, 0.02 to 0.08% by weight of aluminium, 0.02 to 0.08% by weight of a metal selected from the following elements: silicon, tin and chromium, the remainder being uranium.
2. A uranium alloy containing 0.8 to 1.5% by weight of molybdenum, 0.02 to 0.08% by weight of silicon, 0.02 to 0.08% by weight of a metal selected from the following elements: tin and chromium, the remainder being uranium.

References Cited by the Examiner
UNITED STATES PATENTS
2,919,186   12/1959   Colbeck _____ 75—122.7
3,170,788   2/1965   Binstock et al. _____ 75—122.7

FOREIGN PATENTS
821,639   10/1959   Great Britain.
978,449   12/1964   Great Britain.

CARL D. QUARFORTH, Primary Examiner.
BENJAMIN R. PADGETT, Examiner.
M. J. SCOLNICK, Assistant Examiner.